2,750,367

DERIVATIVES OF DEHYDROABIETONITRILE

Thomas F. Sanderson, Wilmington, Del., assignor to Hercules Powder Company, Wilmington, Del., a corporation of Delaware No Drawing. Application March 25, 1955,
Serial No. 496,913

6 Claims. (Cl. 260—99)

The present invention relates to new chemical compounds derived from dehydroabietonitrile and to processes for the preparation of these compounds.

In accordance with the invention, it has been found that dehydroabietonitrile can be modified by reactions including oxidation with anhydrous chromium trioxide to convert the carbon in the 9 position to a keto group and to effect replacement or substitution of the isopropyl group in the 7 position of the dehydroabietonitrile nucleus. The compounds within the scope of the invention are derivatives of 1,2,3,4,4a,9,10,10a-octahydro-1,4a-dimethyl-9-oxo-1-phenanthrenecarbonitrile which have the formula

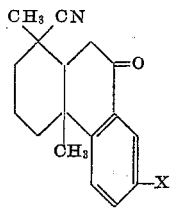

wherein X is a radical selected from the group consisting of acetyl, hydroxyl, isopropenyl, 2-hydroxyisopropyl and 2-acetoxyisopropyl.

The process of the invention includes oxidation of dehydroabietonitrile with anhydrous chromium trioxide to produce a mixture of 7-acetyl-1,2,3,4,4a,9,10,10a-octahydro-1,4a-dimethyl-9-oxo-1-phenanthrenecarbonitrile and 14-acetoxy-9-oxodehydroabietonitrile. The 14-acetoxy-9-oxo-dehydroabietonitrile can then be subjected to pyrolysis under vacuum to produce 1,2,3,4,4a,9,10,10a-octahydro - 7 - isopropenyl - 1,4a - dimethyl-9-oxo-1-phenanthrenecarbonitrile or alternatively can be deacylated in alkaline solution to form 14-hydroxy-9-oxo-dehydroabietonitrile. The 7-isopropenyl derivative can in turn be reacted with tertiary butyl hydroperoxide and sulfuric acid to produce 1,2,3,4,4a,9,10,10a-octahydro-7-hydroxy-1,4a-dimethyl-9-oxo-1-phenanthrenecarbonitrile.

The following examples further illustrate the preparation of the compounds of the invention. All parts and percentages are by weight unless otherwise specified.

Example 1

There was dissolved 5.62 parts of dehydroabietonitrile in a mixture of 52.5 parts of acetic acid and 54 parts of acetic anhydride. The resulting solution was cooled to a temperature of 20–25° C. and 9.33 parts of chromium trioxide was added gradually over a period of 6 hours. After stirring overnight at room temperature, the solution was poured into ice water and stirred for 3 hours. Upon filtration, washing and drying, there was obtained 5.61 parts of a solid precipitate.

The precipitate obtained as above was dissolved in 90 parts of benzene and passed through a column of basic alumina. Four hundred parts of methylene chloride was then passed through the column, and the combined benzene and methylene chloride effluents were evaporated to 2.6 parts of a solid material which was discarded. Continued eluting of the adsorbent with methylene chloride removed an additional 1.51 parts of material which crystallized from the methylene chloride on standing. This latter material was recrystallized twice from methanol and was found to melt at 169.5–170.5° C. *Analysis.*—Found: C, 77.59; H, 7.35. Calculated for $C_{19}H_{21}NO_2$: C, 77.26; H, 7.17. This material was thus identified as 7-acetyl-1,2,3,4,4a,9,10,10a-octahydro-1,4a-dimethyl-9-oxo-1-phenanthrenecarbonitrile.

Example 2

There was dissolved 28.1 parts of dehydroabietonitrile in a mixture of 315 parts of acetic acid and 265 parts of acetic anhydride. The solution was cooled to 20° C. and 46.1 parts of solid chromium trioxide was added in small portions over a period of 8 hours with stirring while maintaining the temperature between 20–25° C. Following the last addition of chromium trioxide, the resultant dark green solution was stirred overnight at room temperature.

The next day the dark green solution was poured into a well-stirred solution of 50 parts of sodium acetate and 3000 parts of ice water. After stirring for 2 hours, a solid precipitate was obtained by decantation. The precipitate was next slurried with ether and 5.24 parts of yellow crystalline product was recovered by filtration.

The yellow crystalline material was dissolved in 30 parts of methylene chloride and passed through a tower of basic alumina. The methylene chloride was then evaporated from the effluent and there was obtained 4.9 parts of a white crystalline material melting at 168–169° C. Two recrystallizations from methanol yielded 4.10 g. of product melting at 169–170° C. This product gave no depression of melting point when admixed with the 7-acetyl derivative prepared in the manner of Example 1, thus showing it to be the same compound.

The ether solution from the first filtration step of this example was combined with the mother liquors from the crystallization steps and evaporated to dryness to yield 24.5 parts of a solid residue. This residue was dissolved in benzene and fractionated by chromatographic adsorption as follows on a column of basic alumina:

| Fraction | Solvent | Weight of Solvent (Parts) | Weight of Residue (Parts) |
|---|---|---|---|
| 1 | Benzene | 440 | } 9.27 |
| 2 | do | 440 | |
| 3 | do | 879 | 3.30 |
| 4 | $CH_2Cl_2$ | 2,670 | 5.14 |
| 5 | $CH_2Cl_2$ | 2,670 | } 3.15 |
| 6 | $CH_2Cl_2$ | 2,670 | |
| Total weight recovered | | | 20.86 |

Fractions 4, 5 and 6 were combined and recrystallized from methanol to yield 4.5 parts of crystals melting at 166° C. These also were analyzed as the 7-acetyl derivative prepared in Example 1.

Example 3

The procedure of Example 2 was followed in oxidizing 2810 parts of dehydroabietonitrile with proportionately larger amounts of acetic acid, acetic anhydride and chromium trioxide. A portion of the solid material recovered after drowning the reaction solution in water was dissolved in benzene and chromatographically adsorbed on basic alumina. The benzene effluent was evaporated to dryness to yield 54.2 parts of a crystalline material. An ultraviolet adsorption curve on this material indicated the absence of any diketone. By recrystallization from methanol there was obtained 34.8 parts of a crystalline material melting at 113–115° C. *Analysis.*—Found: C, 75.17; H, 7.84; N, 3.75. Calculated for $C_{22}H_{27}NO_3$: C, 74.75; H, 7.70; N, 3.96.

The crystalline material was thus identified as 14-acetoxy-9-oxodehydroabietonitrile and was used to verify that the solid material obtained in fractions 1, 2 and 3 of Example 2 was the same compound.

*Example 4*

Three parts of the 14-acetoxy-9-oxodehydroabietonitrile obtained in Example 3 was dissolved in 40 parts of ethyl alcohol containing 1 part of potassium hydroxide and was boiled under reflux for 35 minutes. The solution was then cooled and diluted with 500 parts of water and the precipitate was isolated and dissolved in ether. The ether solution was then washed with water, dried over sodium sulfate, filtered and evaporated to dryness yielding 2.85 parts of crystalline material. This material was then recrystallized from methanol to give two parts of a product melting at 134–135° C. Infrared analysis verified the presence of the nitrile group and the absence of an amide group in the latter. *Analysis.*—Calculated for $C_{20}H_{25}NO_2$: C, 77.13; H, 8.08; N, 4.50. Found: C, 77.39; H, 8.27; N, 4.41. The product was thus identified as 14-hydroxy-9-oxodehydroabietonitrile.

*Example 5*

Six parts of the 14-acetoxy derivative obtained in Example 3 was placed in a vessel equipped for high vacuum distillation. The vessel was then connected to a vacuum pump and the temperature was gradually raised to 180° C. while the pressure decreased to 1 mm. After about 30 minutes at 180° C., the vessel was allowed to cool to room temperature, and examination of the trap revealed the presence of acetic acid. Five parts of a clear yellow resin remained in the flask and this was dissolved in ether and cooled. The precipitate which formed upon cooling was filtered and dried to give 6 parts of crystals melting at 117–119° C. After two recrystallizations from methanol, the crystals melted at 132–134° C. *Analysis.*—Calculated for $C_{20}H_{23}NO$: C, 81.87; H, 7.90. Found: C, 81.97; H, 7.95. The product in this example was thus identified as 1,2,3,4,4a,9,10,10a-octahydro-7-isopropenyl-1,4a-dimethyl-9-oxo-1-phenanthrenecarbonitrile.

*Example 6*

Two parts of the 7-isopropenyl derivative prepared in Example 5 was dissolved in 21 parts acetic acid containing 4 parts of tertiary butyl hydroperoxide and 0.2 part of concentrated sulfuric acid. This solution was heated for 24 hours at 35–40° C. At the end of this time, the acid solution was diluted with water and the resulting precipitate dissolved in ether.

The ether solution was next washed well with water and sodium bicarbonate solution. The ether solution was next extracted with a 1% aqueous solution of sodium hydroxide, and the aqueous extract was then acidified to form a precipitate. The precipitate was then dissolved in ether, washed with water and dried to yield 0.55 part of a crystalline phenolic compound. Recrystallization from benzene yielded 0.5 part of crystals melting at 237–240° C. The product, 1,2,3,4,4a,9,10,10a-octahydro-7-hydroxy-1,4a-dimethyl-9-oxo-1-phenanthrenecarbonitrile, gave a positive phenol test with ferric chloride reagent and gave an ultraviolet absorption curve which exhibited shifted bands in alkaline solution. *Analysis.*—Calculated for $C_{17}H_{19}NO_2$: C, 75.81; H, 7.11; N, 5.20. Found: C, 76.20; H, 7.22; N, 4.97.

The dehydroabietonitrile which serves as a starting reactant in accordance with the invention can be prepared by any of several methods known to the art. One illustrative method is disclosed in U. S. 2,534,297 wherein stabilized rosin nitriles are prepared by reacting dehydrogenated rosin in liquid phase with gaseous ammonia.

In accordance with the invention, dehydroabietonitrile is oxidized by heating a mixture of the nitrile, chromium trioxide and acetic anhydride. The function of the latter compound is to combine with the water produced during the reaction and thus maintain an anhydrous condition. It is, therefore, used in an amount which is at least stoichiometrically sufficient to combine with the liberated water but an excess can be used without detriment. It has been found that maintaining an anhydrous system promotes the desired attack on the isopropyl group of the dehydroabietonitrile without interfering with the oxidative attack at the 9 position.

The acetic anhydride will itself serve as an inert reaction medium, but it is helpful to use an additional solvent for the reactants in order to minimize precipitation of chromium salts. Exemplary of the solvents which may be used are the carboxylic acids, such as acetic acid, propionic acid, dichloracetic acid, etc.; alcohols, such as tert-butyl alcohol, etc. Of particular value is an acid such as acetic acid because it is an excellent solvent for dehydroabietonitrile and also dissolves chromium trioxide. The amount of solvent used in carrying out the reaction is immaterial but should be such an amount that the reacting solution is easily agitated. In general, the amount of solvent which is used is the amount which will result in a 5–25% solution of the nitrile. A more concentrated solution of the nitrile may be used but is difficult to handle. In the same way, larger amounts of solvent may be used but are not generally employed because of the bulk of the reaction mixture which must then be handled.

The amount of chromium trioxide which is used to oxidize the dehydroabietonitrile in accordance with the invention can be varied depending upon the degree of oxidation desired but, in general, is an amount ranging from about 1 mole to about 5 moles per mole of dehydroabietonitrile. In the preceding examples, the amount of chromium trioxide used was equal to approximately 4.5 moles per mole of dehydroabietonitrile, this being the amount stoichiometrically required for the production of 14-acetoxy-9-oxodehydroabietonitrile.

In general, the oxidation is carried out at a temperature of from about 20° C. to 60° C. and preferably from about 25° C. to about 35° C.

As pointed out above, the oxidation step leads to a mixture of products including primarily the 14-acetoxy derivative and 7-acetyl derivative as illustrated in Examples 1, 2 and 3. These two primary products can be separated, as illustrated in the examples, by chromatographic adsorption using a combination of solvents. In addition to benzene and methylene chloride, other solvents such as petroleum ether, heptane, isooctane, diethyl ether, cyclohexane, methylcyclohexane, p-menthane and dipentene can be used.

The conversion of the 14-acetoxy derivative to the 14-hydroxy derivative has been illustrated in Example 4 which represents a typical procedure involving alkaline hydrolysis. Variations in the method of hydrolysis will be readily apparent to those skilled in the art, since the reaction here involved is analogous to many prior art reactions.

The pyrolysis of the 14-acetoxy derivative is illustrated in Example 5 and comprises simply heating of the 14-acetoxy derivative under vacuum. In this step, temperatures of about 160° to about 225° C. are operable.

As illustrated in Example 6, the 7-isopropenyl derivative prepared by the vacuum pyrolysis of the 14-acetoxy derivative can be treated with tertiary butyl hydroperoxide and sulfuric acid to convert it to the 7-hydroxy derivative. In this reaction, the 7-isopropenyl derivative is converted to a 14-hydroperoxy derivative and the latter is decomposed by acid whereby a hydroxyl radical replaces the isopropyl group. The mechanism of this reaction is a manipulative procedure well known to the art in analogous reactions.

The new compositions of this invention have a wide variety of useful applications. The 7-acetyl derivative may be used, for example, in the preparation of delayed tack adhesives from neoprene. As illustrative, a 15% solution of the 7-acetyl derivative in toluene was prepared, and this solution was mixed with a 15% solution of neoprene in toluene in the ratio of 1:1. The mixture thus prepared was painted on a metal strip and allowed to dry. Another metal strip was coated with the neoprene solution alone as a blank. An examination for compatibility of the 7-acetyl derivative and neoprene revealed that they were incompatible as shown by the formation of crystals throughout the test strip. The blank was tacky, but the sample containing the 7-acetyl derivative was completely free of tack. The test strips were then heated until the crystalline material melted, and a strip of paper was pressed onto each test strip. After standing for 24 hours, the pieces of paper were pulled from the test strips and the sample containing the 7-acetyl derivative showed good adhesive properties as evidenced by the fact that the piece of paper was torn as it was removed. The blank strip, however, released the paper without any tearing.

The 14-acetoxy derivative and the 14-hydroxy derivative are both valuable intermediates in the synthesis of new derivatives of resin acids and particularly in the synthesis of the 7-isopropenyl and 7-hydroxy compounds of the invention, both of the latter being useful materials. As has been illustrated in Example 5, the 14-acetoxy derivative can be converted to the 7-isopropenyl derivative by pyrolysis, and the 14-hydroxy derivative can be converted to the 7-isopropenyl derivative by dehydration. The 7-isopropenyl derivative is a valuable copolymerizable monomer which may be used as a replacement for all or part of the styrene used in a standard GR-S process to obtain a rubber having the properties of "cold rubber" without resorting to the necessity of using "cold rubber" techniques.

The 7-isopropenyl derivative can also be copolymerized with butadiene to produce a rubberlike polymer useful as an adhesive. For example, 20 parts of the isopropenyl derivative and 80 parts of 1,3-butadiene were copolymerized in an emulsion system at 40° C. in the presence of 180 parts of water, 0.3 part of potassium persulfate, 4.5 parts of the sodium soap of disproportionated rosin and 0.4 part of mixed $C_{12}$–$C_{16}$ tertiary mercaptans (Phillips MTM). A 66% conversion to polymer was obtained in 44 hours. A rubberlike polymer useful as an adhesive and as a wire covering was obtained by coagulation.

The 7-hydroxy derivative is useful as an oxidation inhibitor by virtue of the phenolic group at position 7 and the potential amino group at position 1. For this purpose it can be used in rubber formulations and similar applications. In addition, the compound has been coupled with diazotized aniline to form a rust brown dye.

The compounds of the invention are also useful intermediates for the preparation of the useful compounds described in copending applications Serial No. 344,471, filed March 24, 1953, and Serial Nos. 371,718 to 371,720, filed July 31, 1953, by Paul F. Ritchie. As will be obvious to those skilled in the art, the compounds of this invention can be converted directly to the compounds disclosed in the Ritchie applications by hydrolysis of the cyano group to the carboxy group using, for example, sodium hydroxide in boiling diethylene glycol.

What I claim and desire to protect by Letters Patent is:
1. The compounds having the formula

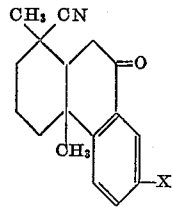

wherein X is a radical selected from the group consisting of acetyl, hydroxyl, isopropenyl, 2-hydroxyisopropyl and 2-acetoxyisopropyl.

2. 7-acetyl-1,2,3,4,4a,9,10,10a-octahydro-1,4a-dimethyl-9-oxo-1-phenanthrenecarbonitrile.

3. 14-acetoxy-9-oxo-dehydroabietonitrile.

4. 1,2,3,4,4a,9,10,10a - octahydro-7-isopropenyl-1,4a-dimethyl-9-oxo-1-phenanthrenecarbonitrile.

5. 14-hydroxy-9-oxo-dehydroabietonitrile.

6. 1,2,3,4,4a,9,10,10a-octahydro - 7 - hydroxy-1,4a-dimethyl-9-oxo-1-phenanthrenecarbonitrile.

References Cited in the file of this patent
UNITED STATES PATENTS

| | | |
|---|---|---|
| 2,461,349 | Ralston et al. | Feb. 8, 1949 |
| 2,703,796 | Ritchie | Mar. 8, 1955 |
| 2,703,809 | Ritchie | Mar. 8, 1955 |